(12) United States Patent
Sharma et al.

(10) Patent No.: US 11,507,084 B2
(45) Date of Patent: Nov. 22, 2022

(54) COLLABORATIVE 3-D ENVIRONMENT MAP FOR COMPUTER-ASSISTED OR AUTONOMOUS DRIVING VEHICLES

(71) Applicant: Intel Corporation, Santa Clara, CA (US)

(72) Inventors: Sridhar G. Sharma, Palo Alto, CA (US); S M Iftekharul Alam, Hillsboro, OR (US); Nilesh Ahuja, Cupertino, CA (US); Avinash Kumar, Santa Clara, CA (US); Jason Martin, Beaverton, OR (US); Ignacio J. Alvarez, Portland, OR (US)

(73) Assignee: Intel Corporation, Santa Clara, CA (US)

(*) Notice: Subject to any disclaimer, the term of this patent is extended or adjusted under 35 U.S.C. 154(b) by 899 days.

(21) Appl. No.: 16/366,120

(22) Filed: Mar. 27, 2019

(65) Prior Publication Data

US 2019/0220003 A1    Jul. 18, 2019

(51) Int. Cl.
*G05D 1/00* (2006.01)
*H04W 4/46* (2018.01)
(Continued)

(52) U.S. Cl.
CPC ........... *G05D 1/0044* (2013.01); *G01C 21/32* (2013.01); *G01C 21/3841* (2020.08);
(Continued)

(58) Field of Classification Search
CPC .... G05D 1/0044; G05D 1/0274; G01C 21/32; G01C 21/3841; G06K 9/6256;
(Continued)

(56) References Cited

U.S. PATENT DOCUMENTS 5,123,084 A * 6/1992 Prevost .............. G06T 17/005
345/420
9,612,123 B1 * 4/2017 Levinson ............... G01C 21/26
(Continued)

FOREIGN PATENT DOCUMENTS

CN          109383423 A  *  2/2019   ......... B60R 16/0231
WO    WO-2021138616 A1  *  7/2021   ......... G01C 21/3841

OTHER PUBLICATIONS

Kevin Eykholt et al., "Robust Physical-World Attacks on Deep Learning Visual Classification", 2018, 10 pages, Conference on Computer Vision and Pattern Recognition (CVPR).
(Continued)

*Primary Examiner* — Dale W Hilgendorf
(74) *Attorney, Agent, or Firm* — Schwabe, Williamson & Wyatt, P.C.

(57) ABSTRACT

Disclosures herein may be directed to a method, technique, or apparatus directed to a computer-assisted or autonomous driving (CA/AD) vehicle that includes a system controller, disposed in a first CA/AD vehicle, to manage a collaborative three-dimensional (3-D) map of an environment around the first CA/AD vehicle, wherein the system controller is to receive, from another CA/AD vehicle proximate to the first CA/AD vehicle, an indication of at least a portion of another 3-D map of another environment around both the first CA/AD vehicle and the another CA/AD vehicle and incorporate the at least the portion of the 3-D map proximate to the first CA/AD vehicle and the another CA/AD vehicle into the 3-D map of the environment of the first CA/AD vehicle managed by the system controller.

24 Claims, 10 Drawing Sheets

(51) Int. Cl.

| | | |
|---|---|---|
| *G06N 7/00* | (2006.01) | |
| *G06K 9/62* | (2022.01) | |
| *G06N 3/08* | (2006.01) | |
| *G06N 3/04* | (2006.01) | |
| *G06V 20/58* | (2022.01) | |
| *G01C 21/32* | (2006.01) | |
| *G01C 21/00* | (2006.01) | |
| *G08G 1/0967* | (2006.01) | |
| *G05D 1/02* | (2020.01) | |
| *G06N 20/10* | (2019.01) | |
| *G06T 17/00* | (2006.01) | |

(52) U.S. Cl.
CPC ......... *G05D 1/0274* (2013.01); *G06K 9/6256* (2013.01); *G06K 9/6277* (2013.01); *G06N 3/0454* (2013.01); *G06N 3/08* (2013.01); *G06N 7/005* (2013.01); *G06V 20/58* (2022.01); *G06V 20/582* (2022.01); *G08G 1/096791* (2013.01); *H04W 4/46* (2018.02); *B60W 2556/65* (2020.02); *G06N 20/10* (2019.01); *G06T 17/005* (2013.01)

(58) Field of Classification Search
CPC ...... G06K 9/6277; G06N 3/0454; G06N 3/08; G06N 7/005; G06N 20/10; G06V 20/582; H04W 4/46; G08G 1/096791; G06T 17/005; B60W 2556/65
See application file for complete search history.

(56) References Cited

U.S. PATENT DOCUMENTS

| | | | | |
|---|---|---|---|---|
| 2007/0005609 | A1* | 1/2007 | Breed | B60W 50/00 |
| 2007/0030212 | A1* | 2/2007 | Shibata | G08G 1/162 |
| | | | | 345/9 |
| 2017/0025017 | A1* | 1/2017 | Thomas | B60W 10/18 |
| 2018/0188045 | A1* | 7/2018 | Wheeler | G01C 21/3811 |
| 2019/0113927 | A1* | 4/2019 | Englard | G05D 1/0221 |
| 2019/0258251 | A1* | 8/2019 | Ditty | G05D 1/0088 |
| 2019/0266748 | A1* | 8/2019 | Ahmad | G06T 7/74 |
| 2019/0323855 | A1* | 10/2019 | Mahler | G05D 1/0088 |
| 2021/0101624 | A1* | 4/2021 | Philbin | B60W 60/0016 |
| 2022/0083807 | A1* | 3/2022 | Zhang | G06K 9/628 |

OTHER PUBLICATIONS

D. A. Forsyth et al., "Computer Vision: A Modern Approach. Prentice Hall Professional Technical Reference, Chapter 25", 2002, 71 pages.

Hartley, R. Hartrley et al., "Multiple View Geometry in Computer Vision", 2003, pp. 237-360, New York, NY, USA: Cambridge University Press.

Naveed Akhtar etal, "Threat of Adversarial Attacks on Deep Learning in Computer Vision: A Survey", 2018, 21 pages, IEEE Access.

S. K. Moore, "Supera-ccurate GPS Coming to Smartphones in 2018", Nov. 2017, 2 pages, Retrieved from IEEE Spectrum: http://www.spectrum.ieee.org/tech-talk/semiconductors/design/superaccurate-gps-chips-coming-to-smartphones-in-2018.

Seyed-Mohsen Moosavi-Dezfooli et al., "Universal adversarial perturbations", 2017, 9 pages, IEEE Conference on Computer Vision and Pattern Recognition (CVPR).

Nicolas Papernot et al., "Practical Black-Box Attacks against Machine Learning", Mar. 19, 2017, 14 pages, ACM Asia Conference on Computer and Communications Security.

Jiawei Su et al., "One pixel attack for fooling deep neural networks", May 3, 2019, 15 pages, CoRR, abs/1710.08864. Retrieved from http://www.arxiv.org/abs/1710.08864.

Armin Hornung et al., "OctoMap: An Efficient Probabilistic 3D Mapping Framework Based on Octrees", 2013, 17 pages.

Junchen Jiang et al., "Chameleon: Scalable Adaptation of Video Analytics", 2018, 14 pages, In Proceedings of the 2018 Conference of the ACM Special Interest Group on Data Communication (SIGCOMM '18).

* cited by examiner

900

Non-transitory computer-readable storage medium
902

Programming Instructions 904
configured to cause a device, in response to execution of the programming instructions, to practice (aspects of) embodiments of the process(es) of Figures 1-8 and 10.

COLLABORATIVE 3-D ENVIRONMENT MAP FOR COMPUTER-ASSISTED OR AUTONOMOUS DRIVING VEHICLES

FIELD

The present disclosure relates to the field of computer-assisted or autonomous driving (CA/AD). More particularly, the present disclosure relates to method and apparatus for collaboratively constructing a 3-D view of an environment around a CA/AD vehicle.

BACKGROUND

When CA/AD vehicles and people driven vehicles drive on the same roadway, especially in freeways or highways, there might be co-existence, trust and safety issues. For example there may be differences in response times, speeds, rates of acceleration, situational awareness and alertness levels between the vehicles, which may cause accidents or other roadway incidents if the vehicles are not aware of their surroundings.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
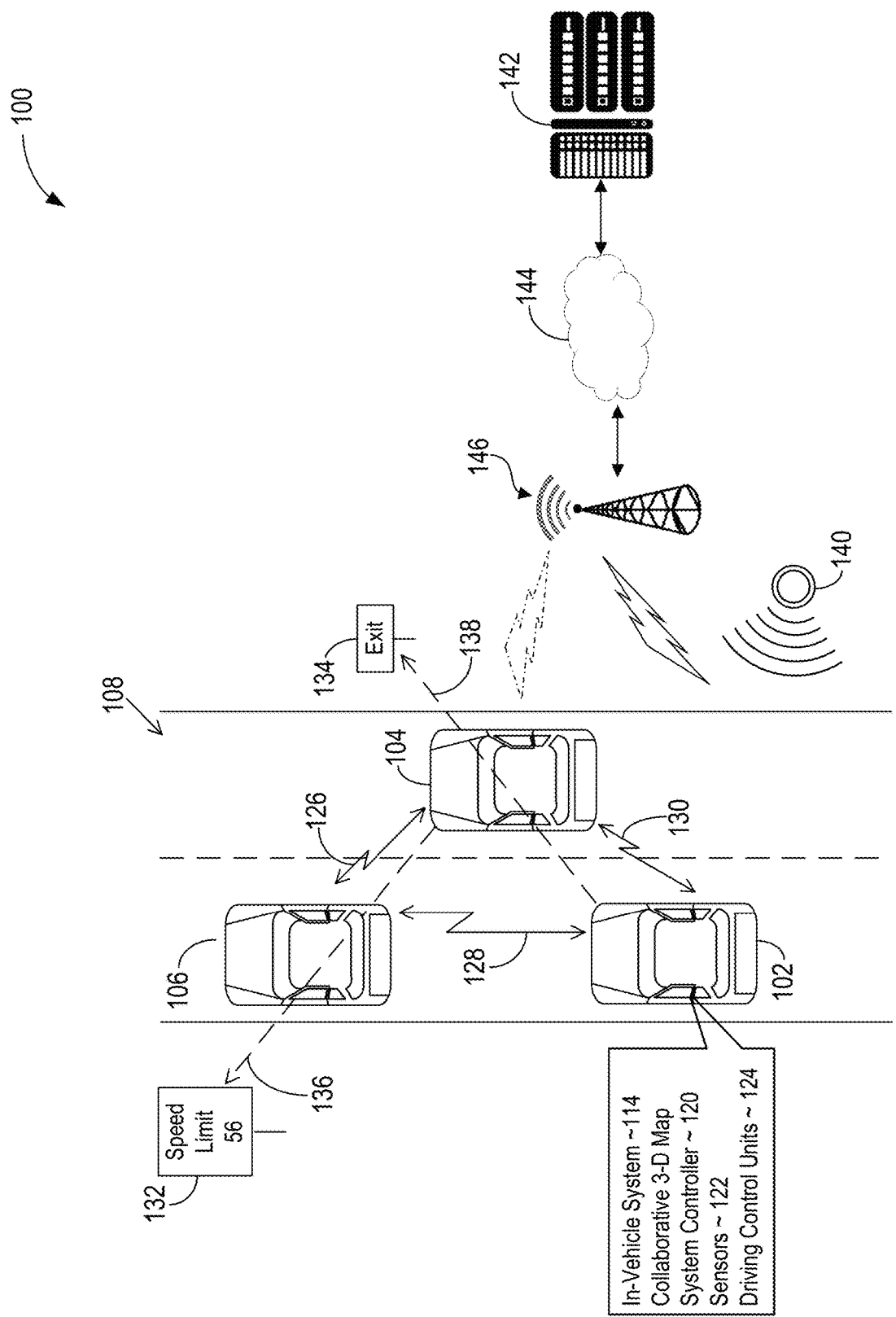
FIG. 1 illustrates an overview of an environment for CA/AD vehicles assisted by collaborative three dimensional (3-D) mapping technology of the present disclosure, in accordance with various embodiments.

Disclosures herein may be directed to a method, technique, or apparatus associated with a CA/AD that includes a system controller, disposed in a first CA/AD vehicle, to manage a collaborative three-dimensional (3-D) map of an environment around the first CA/AD vehicle, wherein the system controller is to receive, from another CA/AD vehicle proximate to the first CA/AD vehicle, an indication of at least a portion of another 3-D map of another environment around both the first CA/AD vehicle and the other CA/AD vehicle and incorporate the received indication of the at least the portion of the 3-D map proximate to the first CA/AD vehicle and the other CA/AD vehicle into the 3-D map of the environment of the first CA/AD vehicle managed by the system controller. In embodiments, the 3-D map includes an indication of one or more objects, wherein an object includes a classification selected from one of a plurality of classifications and wherein one of the one or more objects is detected by the another CA/AD vehicle and is not detectible by the first CA/AD vehicle. In other embodiments, one or more objects from multiple CA/AD vehicles or from other sources may be compared to identify discrepancies to determine whether one of the one or more objects should be omitted from the collaborative 3-D map.

The number of CA/AD vehicles on the road will continue to increase in the foreseeable future. These CA/AD vehicles will be built by different manufacturers, with various components and parts supplied by various automotive original equipment manufacturers (OEMs). These various CA/AD vehicles may deploy very different techniques to scan for, identify and classify objects in a 3-D map of the environment proximate to the CA/AD vehicle. During operation of a CA/AD vehicle, its field of view may be blocked by other vehicles or objects. As a result, sensors of the CA/AD vehicle, including cameras, may be prevented from identifying and classifying objects proximate to the CA/AD vehicle that may be relevant to CA/AD vehicle operation.

It is important that a CA/AD vehicle has a comprehensive view of its proximate environment to be able to navigate the environment in a safe and efficient manner. In embodiments described herein, information from other CA/AD vehicles may be shared with the CA/AD vehicle to provide a comprehensive collaborative 3-D map that includes objects in the surrounding environment. This information may include, for example, portions of one of the other CA/AD vehicle's 3-D map, data from the other CA/AD vehicle's sensors, and positioning data of the other CA/AD vehicle's sensors, that are leveraged to build a collaborative 3-D map of the environment that will include objects blocked from the CA/AD vehicle's view.

In embodiments, various objects that have been classified in the surrounding environment are represented in a particular CA/AD vehicle map and may be associated with a coordinate system local to the particular CA/AD vehicle. Prior to incorporating these various objects into a collaborative 3-D map, a localization technique may be applied to convert the coordinate system of the location of the various classified objects within the particular CA/AD vehicle map to the coordinate system of the collaborative 3-D map. In embodiments, this localization technique may be performed remotely (e.g. at a remote server) with respect to a particular CA/AD vehicle or may be performed as part of a system within the CA/AD vehicle.

In addition, before augmenting the collaborative 3-D map with various classified objects from individual CA/AD vehicles, there may be a collaborative 3-D map comparator technique applied to evaluate the source of the various classified objects that might be integrated, and to determine the trustworthiness of the respective classified objects to determine which should be used to augment the collaborative 3-D map. In one example, an object might be identified by multiple CA/AD vehicles, however the object might be misclassified by one or more of the vehicles, and a weighting system or some other voting system may be used to decide on the proper classification of the object. In another example, data with respect to classified objects may appear to come from valid CA/AD vehicles but may actually be spoofed by a malicious actor intending to corrupt the collaborative 3-D map or to perform some other adversarial attack. In this case, source identification information, as well as other weighting information, may be used to identify and discard the spoofed data. In this way, the diversity of sources of collaborative 3-D map information is leveraged to protect against a white box attack.

During operation, a CA/AD vehicle uses a number of cameras and other sensors to sense the surrounding environment. This information is sent to the computational systems within the CA/AD vehicle for processing and for navigation use. Due to occlusions by other vehicles and other objects, the CA/AD vehicle's local view of the environment may be partially limited or obstructed, and it may be unable to see certain objects that are blocked by the other vehicles. Embodiments described herein are generally related to allowing the CA/AD vehicle to identify the location and the classification of these objects for path and trajectory planning. Leveraging other CA/AD vehicles' sensors and ability to identify objects, and then building a collaborative 3-D map of the environment, is facilitated by the availability of vehicle to vehicle (V2V) communication technologies. In embodiments, a CA/AD vehicle can construct a 3-D map of its environment using, for example, 3-D reconstruction techniques from multiple 2D images captured by the CA/AD vehicle.

Embodiments may be directed to a consensus-based object observer and classifier system to allow CA/AD vehicles generate an accurate 3-D map of their environment by leveraging information from other CA/AD vehicles. The diversity in object classifiers makes the system able to detect objects in the environment that may not be visible to a CA/AD vehicle due to occlusions of the objects with respect to their sensors. Also, by leveraging multiple type of classifiers the system decreases the susceptibility to new scenarios which may not be sufficiently covered by training on one or more of the neural networks that may be embedded in a CA/AD vehicle. Different vendors may train neural networks based on different training sets which may be derived from real world driving or driving simulation. By collaborating with other CA/AD vehicles it is possible to leverage a larger and more diverse training set.

Figure 3:
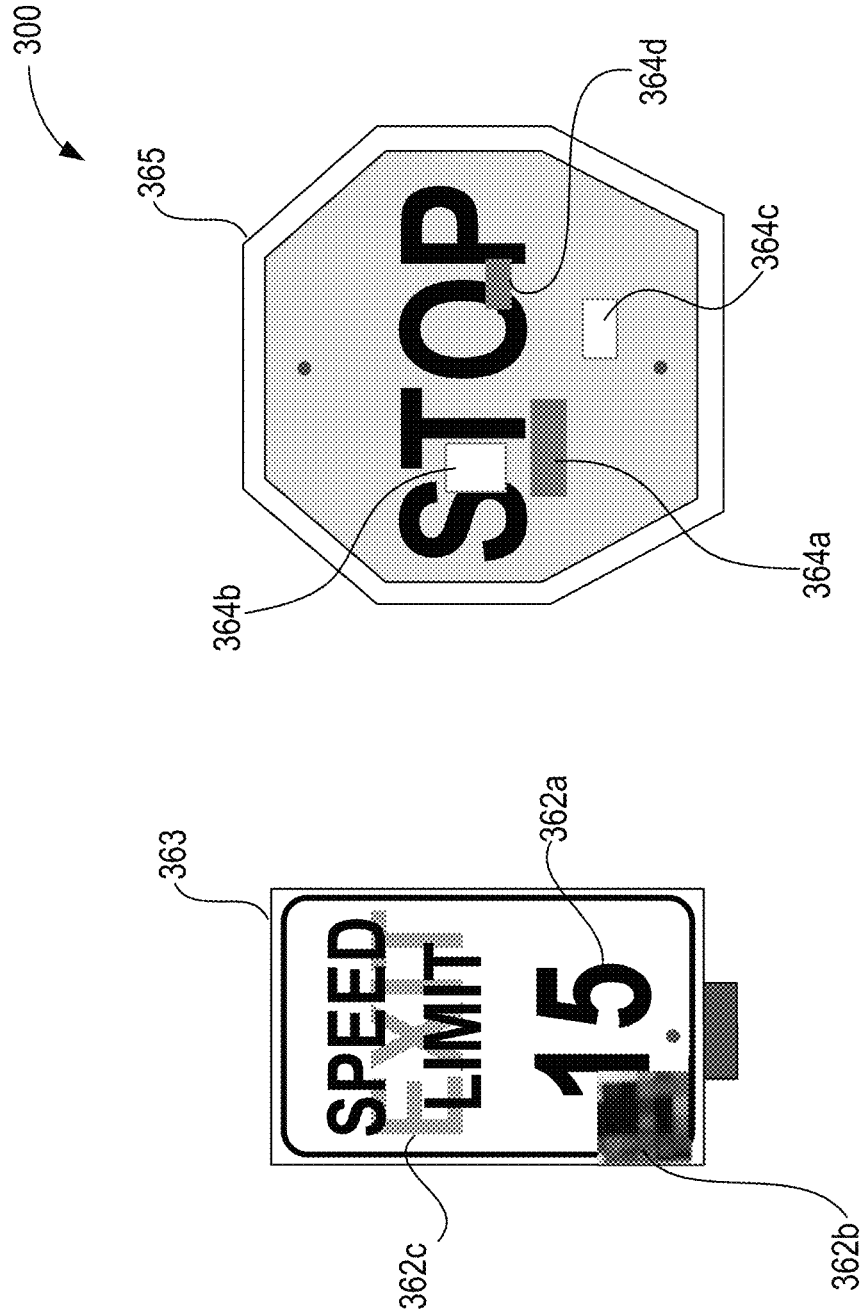
FIG. 3 illustrates example detected objects for evaluation for inclusion in a collaborative 3-D map, in accordance with various embodiments.

In embodiments, neural networks may be vulnerable to adversarial examples (i.e., inputs that are close to natural inputs but are classified incorrectly). Adversarial examples, which may be crafted through minor perturbations (e.g., as shown in FIG. 3) to input images with an intention of fooling a deep neural network, may misclassify with a high confidence. The perturbations may be cleverly crafted security attacks by malevolent actors. In embodiments, such perturbations may be identified and the specific class may be removed from the segmentation output (e.g., removing pedestrians or cars from the road). These kind of security attacks may result in results that cause significant errors in self-driving vehicles and other real-world systems. Leveraging the diverse set of deep neural networks which may be embedded in different vehicles in close proximity to each other makes the collective set of deep neural networks more immune to adversarial attacks. The diversity of embedded implementations in multiple CA/AD vehicles results in deep neural networks with different topologies and hyper parameters. The set of CA/AD vehicles collaborating to build a collaborative, cogent 3-D view of the environment is not known a-priori. The diversity of neural networks and the stochastic nature of the ensemble of neural networks used for identifying and classifying objects in the immediate environment results in more resiliency to adversarial attacks.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices that cooperate and/or interact through one or more network linkages such as wired and/or wireless networks. By way of example and not limitation, a computing apparatus may include two or more computing devices "coupled" on a motherboard or by one or more network linkages.

The term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The term "computer-readable storage media" may refer to, be a part of, or otherwise include media on which data, including instructions of a module that may be executed, may reside. Computer-readable storage media may be either transitory or non-transitory.

As used herein, the term "semi-autonomous driving" is synonymous with computer-assisted driving. The term does not mean exactly 50% of the driving functions are automated. The percentage of driving functions automated may be a fraction of a percent to almost 100%.

Various operations are described as multiple discrete operations in turn, in a manner that is most helpful in understanding the claimed subject matter. However, the order of description should not be construed as to imply that these operations are necessarily order dependent.

FIG. 1 illustrates an overview of an environment for CA/AD vehicle assisted by collaborative three-dimensional (3-D) mapping technology of the present disclosure, in accordance with various embodiments. Diagram 100 shows an example of three CA/AD vehicles 102, 104, 106 driving along roadway 108. Each of the CA/AD vehicles 102, 104, 106, in general, includes an in-vehicle system (IVS) 114, sensors 122 and driving control units 124, of various types, which might be the same or different. In embodiments, the sensors 122 may include camera-based sensors (not shown) and/or LIDAR-based sensors (not shown) that may be positioned around the perimeter of the CA/AD vehicle 102, 104, 106 to capture imagery proximate to the vehicle to identify and categorize relevant objects in the environment. In embodiments, driving control units 124 may include various electronic and mechanical control units to control the engine, the transmission, and/or the braking systems of CA/AD vehicles 102, 104, and 106.

In embodiments, the CA/AD vehicles 102, 104, 106 are also configured with communication circuitry to enable the vehicles to be in communication with each other via communication links 126, 128, 130 and may share information related to the proximate environment. In particular, for the illustrated embodiments, at least CA/AD vehicle 102 is configured with a collaborative 3-D map system controller 120 incorporated with the collaborative 3-D mapping technology of the present disclosure to provide CA/AD vehicles 102 with a more accurate collaborative 3-D map to guide/assist CA/AD vehicle 102 in navigating through the environment on roadway 108 to its destination. Collaborative 3-D map system controller 120 is configured to receive various sensor and object information collected/detected by the CA/AD systems of the other CA/AD vehicles 104 and 106. The information is evaluated by collaborative 3-D map system controller 120, and combined with local sensor and object detection data to create a potentially more accurate collaborative 3-D map.

Along roadway 108, there may be various objects, such as a speed limit sign 132 or an exit sign 134, useful for the CA/AD vehicles 102 to be aware of for navigation purposes. However, as shown in diagram 100, some of these various objects may not be detectable by CA/AD vehicle 102 because they may be occluded from the vehicle's view. For example, the speed limit sign 132 may not be detectable by CA/AD vehicle 104 due to CA/AD vehicle 106 obstructing the line of sight 136 of CA/AD vehicle 104. Similarly, the exit sign 134 may not be detectable by CA/AD vehicle 102 due to CA/AD vehicle 104 obstructing the line of sight 138 of CA/AD vehicle 102. There is a benefit for each of the CA/AD vehicles 102, 104, 106 to have access to an accurate 3-D map of the environment that includes all relevant objects, not just those able to be seen by a particular CA/AD vehicle. However, for ease of understanding, the remaining description will focus and further describe the collaborative 3-D mapping technology of the present disclosure, with respect to CA/AD vehicle 102, receiving sensor and/or object data from other CA/AD vehicles 104 and 106. The other CA/AD vehicles 104 and 106 themselves, beside assisting in sharing their sensor and/or object detection data may or may not practice the full collaborative 3-D mapping technology of the present disclosure. It is to be understood that the present disclosure is not so limited. The present disclosure may be practiced with some or all of CA/AD vehicles 102, 104 and 106 having the collaborative 3-D mapping technology of the present disclosure.

Embodiments described herein are directed to systems, processes, apparatus, and techniques for CA/AD vehicles 102, 104, 106 to implement all or portions of a collaborative 3-D map of classified objects for an environment proximate to the CA/AD vehicles 102, 104, 106. The collaborative 3-D map may be augmented by sharing portions of a 3-D map stored in the 3-D map system controller 120, respectively, within CA/AD vehicles 102, 104, 106. The objects within the 3-D map may be identified and collectively validated using sensors 122, respectively, of CA/AD vehicles 102, 104, 106. In addition, sensor-based object identification and portions of a collaborative 3-D map may be maintained, stored, or shared by other entities, such as a fixed-position beacon 140, that may be positioned near roadway 108 and proximate to CA/AD vehicles 102, 104, 106.

In embodiments, one or more servers 142 may implement portions of the techniques related to creating, maintaining, and distributing collaborative 3-D map. The one or more servers 142 may be coupled via the Internet 144 and in communication with one or more of the CA/AD vehicles 102, 104, 106 via wireless communication antennas 146. In embodiments, portions of the collaborative 3-D map may be identified, updated, and/or shared between the CA/AD vehicles 102, 104, 106. In embodiments, the CA/AD vehicles 102, 104, 106 may share sensor data with the one or more servers 142, and/or may receive or access updates of the collaborative 3-D map from the one or more servers 142.

Embodiments are also directed to maintaining the integrity of the collaborative 3-D map by identifying erroneous or incorrect observations or classifications of objects that are not to be included in the collaborative 3-D map. These erroneous or incorrect observations may be the result of poor quality sensor 122 data, or may be attempts by others to maliciously obscure or otherwise alter, electronically or physically, objects such as the speed limit sign 132 or the exit sign 134.

Figure 2:
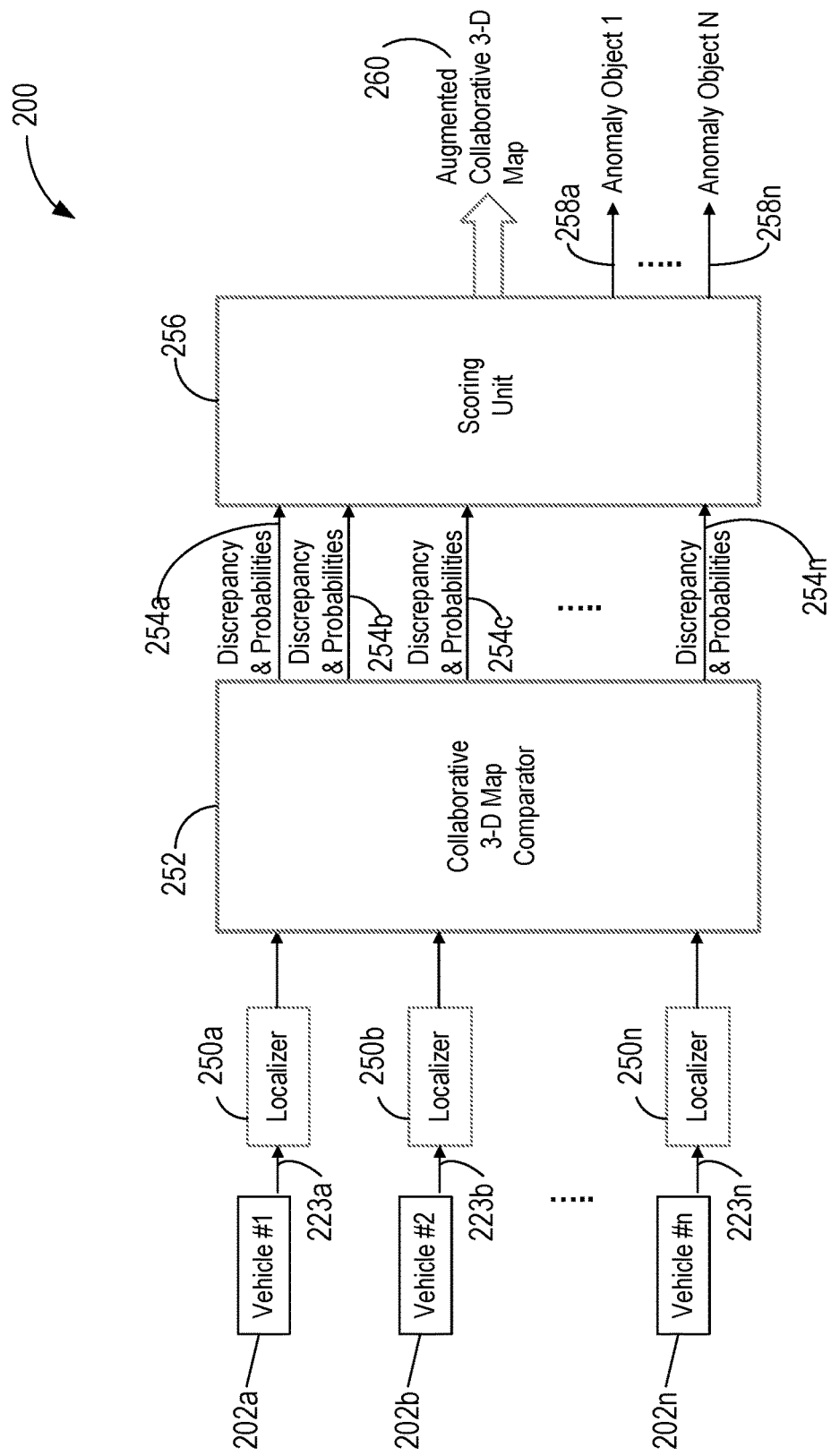
FIG. 2 illustrates a block diagram of example CA/AD data flows for implementing a collaborative 3-D map, in accordance with various embodiments.

FIG. 2 illustrates a block diagram of example CA/AD data flows for implementing a collaborative 3-D map, in accordance with various embodiments. Diagram 200 shows an example of CA/AD data flows from vehicles 202a-202n, which may be similar to CA/AD vehicles 104 and 106 of FIG. 1, that includes data 223a-223n, respectively, which may include data based upon sensor data collected by sensors of CA/AD vehicles 104 and 106 of FIG. 1. In embodiments, this data may include photographic images, LIDAR images, infrared and/or ultraviolet imagery. In other embodiments, the data may include radar, sonar, or other similar imagery.

In embodiments, the data 223a-223n may include an identification and/or classification of objects, for example the identification of a speed limit sign 132 object as a speed limit sign, or an exit sign 134 object as an exit sign. In embodiments, captured imagery, as described above, may be analyzed to identify and to classify these objects. Additional information may be included in the data 223a-223n, for example location information or additional information that may be used to assign a probability associated with correct identification or classification of the object. In embodiments, the data 223a-223n may also include portions of a 3-D map used by the vehicles 202a-202n. All or portions of the 3-D map may be generated and maintained by some or all of the vehicles 202a-202n.

A localizer 250a-250n on the respective CA/AD vehicles may be used to identify a location for objects, including classified objects, represented in the data 223a-223n. In embodiments, the localizer 250 may determine the identified location of the objects relative to a location of the sending vehicle 202a-202n. In other embodiments, the localizer 250a-250n may identify the objects in data 223a-223n with reference to a 3-D coordinate system local to the vehicles 202a-202n, respectively. In some embodiments where the sending CA/AD vehicles are also incorporated with the full range of the collaborative 3-D mapping technology, the sending CA/AD vehicles may also determine a translation from the vehicles' 202a-202n coordinate systems to a coordinate system used by the collaborative 3-D map comparator 252. The 3-D map comparator 252 may be part of collaborative 3-D map system controller 120 of FIG. 1.

The localizer 250a-250n may use the technique of leveraging the fact that the vehicles 202a-202n have overlapping fields of view when driving on the same road. This may be referred to as stereo-vision based simultaneous localization and mapping (SLAM). In embodiments, a first CA/AD vehicle 202a may generate sparse 3-D features of the environment, referred to as Oriented FAST and Rotated BRIEF (ORB) features, where each feature is associated with a precise position relative to a well-defined coordinate frame of reference. Another CA/AD vehicle 202b will find the matching features in its field of view. In embodiments, a rigid body transform matrix between the two CA/AD vehicles 202a, 202b may be determined.

With respect to this technique, the goodness of match is measured by an inter-vehicular matching cost $$C^{iv}(R,t) = \Sigma \|p_{self} - \Pi(p_{other}; R, t)\|^2$$

where $p_{self}$ is the location of a feature in the reference CA/AD vehicle's image plane, $p_{other}$ is the location of the corresponding feature in the other vehicle's image plane, and $\Pi$ is a function that projects features from the image plane of the other vehicle to the image plane of the reference vehicle. The summation is taken over the set of corresponding features. $\Pi$ depends on camera intrinsic characteristics (which are known) and transformation parameters R and t.

The localizer 250a-250n may use the technique of leveraging sparse 3-D high-definition (HD) maps captured in addition to images by a first vehicle and a second vehicle. For the first vehicle, a set of matches are found between the 2D image and its corresponding sparse 3-D volumetric data. Given the known 3-D information, a point from the first vehicle is now projected onto the camera in the second vehicle as a function of R,t. The projected image point is then compared with observed image point in image formed by camera in the second vehicle. Formally the cost function being minimized is, $$C^{map} = \Sigma \|p_{other} - \Pi(P_{map}; R, t)\|^2$$

where $P_{map}$ is the 3-D coordinate of the key point corresponding to $p_{self}$.

A CA/AD vehicle 202a-202n then processes each 3-D frame, extracts the ORB features, then matches these with the sparse 3-D map. The vehicle can then localize itself versus the global coordinate system that is used in the HD map. Other CA/AD vehicles 202a-202n may also localize themselves with respect to the same reference. Hence transforms may occur from different vantage points to a common vantage point for reference.

In another embodiment, the 3-D map is aligned directly by using the objects and bounding boxes that are determined by running a deep neural network classifier. Once this semantic information is available it may be used to find common objects and their location in the volumetric space. Common key points may be found for the same objects as seen by different vehicles. A fundamental matrix may be computed that is decomposed into a relative rotation R and translation t.

Another embodiment is to align the 3-D map directly by using the semantic information such as labels and locations of common objects visible from both vehicles. Each vehicle maintains a set of objects visible to it and their corresponding locations and poses in its own local reference frame. By comparing the labels of the set of objects obtained from another vehicle, the intersection set of objects visible from both is determined. The location and pose of a common object in the two local vehicle reference frames may then be used to compute the transformation matrix required to align the 3-D maps.

The cost function here can be defined as $$Csem = \Sigma \{Obj_{self}, Obj_{other} \in \text{all-sematic-objects}\} \|Obj_{self} - \Pi Obj_{other}; R, t)\|$$

The total cost function is a weighted combination of the above components:

$$C = \lambda^{gps} C^{gps} + \lambda^{iv} C^{iv} + \lambda^{map} C^{map} + \lambda^{sem} C^{sem}$$

where the weights $\lambda$ depend on the relative accuracy of each method. For instance. since GPS based localization is less accurate than the other two methods, its weight would be the lowest. Such a formulation allows the flexibility to ignore a modality by setting its weight to zero.

In embodiments, once the data 223a-223n has been processed by the localizer 250a-250n and sent to the receiving CA/AD vehicle (e.g., CA/AD vehicle 102 of FIG. 1), the resulting localized data may be compared, and also compared with an existing collaborative 3-D map using a collaborative 3-D map comparator 252, which may be part of collaborative 3-D map system controller 120 of FIG. 1. In other embodiments, the collaborative 3-D map comparator 252 may be part of system 142 of FIG. 1 instead.

Returning to the data 223a-223n, in embodiments, the location of identified and classified objects may be provided in a compact representation of the 3-D space, which may be used to represent all or portions of a 3-D map local to a vehicle or a collaborative 3-D map. Such a compact representation of a 3-D space may be referred to as a volumetric mapping representation. One approach to a volumetric mapping representation is to use an octree. An octree partitions a 3-D space into 8 octants. This partitioning may be done recursively to show increasing detail and may be used to create a 3-D model of environments that is easily updateable, flexible and compact. In embodiments, a 3-D view that each vehicle creates based on sensor 122 data or other techniques may be represented using an octree.

In embodiments, the octree is a representation from one vantage point of a CA/AD vehicle 202a-202n, which includes a position and pose. For example, a photographic image captured by a camera sensor 122 of FIG. 1 will produce a 2-D image. A resulting 3-D representation may be constructed from many 2-D images from observations captured at different vantage points. During a construction of a 3-D representation, the 2-D images may be referenced to a single vantage point on the vehicle 202a-202n. An octree representation of an object may be from different vantage points. In order to identify the location of an object within a 3-D map, a coordinate system may be repositioned to align to the two observations from, for example, different cameras. This may be done using a rigid body transformation.

Rigid body transformation matrix $T_{cw}$ contains a 3×3 rotation matrix and a 3-element translation vector. This transformation matrix describes how to transform a position from one camera's coordinate frame to another.

$$T_{cw} = \begin{bmatrix} RotX.x & RotY.x & RotZ.x & Translation.x \\ RotX.y & RotY.y & RotZ.y & Translation.y \\ RotX.z & RotY.z & RotZ.z & Translation.z \\ 0 & 0 & 0 & 1 \end{bmatrix} = \begin{bmatrix} R & t \\ 0 & 1 \end{bmatrix}$$

The above transformation can be estimated by optimizing a cost-function, C, which is minimized when the scenes from the two cameras are registered. The cost-function C may include a number of components which are described as follows.

As referred to above, there may be various ways to build a collaborative 3-D map of the environment, using the collaborative 3-D Map comparator 252. In embodiments, this may involve different vehicles 202a-202n periodically broadcasting the serialized representation of their octree along with a timestamp and its frame of reference, for example a common reference such as from a high definition (HD) map. Other vehicles 202a-202n will then update their octree, especially in the areas where they have a low confidence due to obstacles and other impairments. This may be slightly less efficient from a bandwidth standpoint, but overall transmitting octrees with semantic information incurs less overhead than transmitting, for example, raw point clouds.

In implementing these embodiments, increased accuracy for the determined location of the classified objects, or the CA/AD vehicles 202a-202n, provides a more accurate collaborative 3-D map. For example, GPS coordinates and the pose of the different CA/AD vehicles 202a-202n from which data 223a-223n are received is one way to estimate the translation and rotation to unify the coordinate references. Standard GPS data has an error in the order of 5 meters. This is especially true in urban canyons as well as other dense urban environments. Precision GPS systems require extensive stationary calibration times or complex equipment configurations and are expensive. Some systems achieve sub-meter accuracy using only a single-frequency GPS using a network of receivers sharing raw satellite measurements. It is possible that each participating CA/AD vehicle 202a-202n (node) is able to localize all other CA/AD vehicles 202a-202n in the network using pairwise combinations of satellite observations. Hence, each CA/AD vehicle 202a-202n is able to create an internal mapping of the locations of each of the other CA/AD vehicles 202a-202n in terms of a set of 3-D position vectors with respect to its own local coordinate system. Also, new GPS chips may solve the accuracy issue, achieving 30 centimeter (cm) accuracy. These new GPS chips leverage the newer generation satellites which broadcasts the more complex L5 signal in addition to the legacy L1 signal. The L5 signal is less immune to multi-path interference which is common in dense urban environments due to the fact it has a narrower duration and a more pronounced peak.

Note that UPS can provide only translational information, not orientation, Let $l^{(gps)}_{self}$ be the location of the reference CA/AD vehicle as reported by its GPS and $l^{(gps)}_{other}$ be the location of the other CA/AD vehicle. Then $C^{gps}(t) = \|\|l^{(gps)}_{self} - l^{(gps)}_{other}\| - t\|^2$ is a cost that forces the estimated translation match the UPS measurements.

Another approach to build a collaborative 3-D map of the environment is to have the vehicles 202a-202n only broadcast a subset of the octree. For example, a vehicle 202a-202n can broadcast, the subtree(s) in which the vehicle 202a-202n has a low confidence, and then send a request to another vehicle 202a-202n view to improve the vehicles confidence score.

Another approach to build a collaborative 3-D map of the environment is to rely on the infrastructure, for example server 142 of FIG. 1, to generate an aggregate computation from data received from the different vehicles 202a-202n or from other sources such as observation point 140, and then broadcast all or part of the resulting collaborative 3-D map from a common reference point, for example antenna 146, to the vehicles 202a-202n.

The collaborative 3-D map comparator 252 may also perform discrepancy detection, taking localized data from each of the localizers 250a-250n, and in the process of rendering a collaborative 3-D map identify various discrepancies among the localized data, and may also assign various probabilities that may indicate the degrees of validity of the various discrepancy. An example of a discrepancy may be different identifications of an object, and/or different characterizations of the object based on data from different vehicles 202a-202n. This discrepancy and probability data 254a, 254b, 254c, . . . , 254n may then be sent to a scoring unit 256, which may be part of collaborative 3-D map system controller 120 of FIG. 1 or server 142 of FIG. 1, to determine which discrepancies to include in the augmented collaborative 3-D map 260, and which discrepancies are in fact anomaly objects 258a-258n that should not be included in the augmented collaborative 3-D map 260.

With each vehicle 202a-202n using its sensors 122 to identify, determine the location of, and/or classify objects within its immediate environment, there will be discrepancies in this data when compared with localized data resulting respectively from localizers 250a-250n. Thus, embodiments may include one or more techniques to use to build a consensus to determine which objects and their respective classification and location are to be included in the augmented collaborative 3-D map 260.

In embodiments, a majority voting technique may be used where a voting weight is a function of the detection probability. In embodiments, this voting weight may be applied to each object in the octree. The probability from the semantic scene segmentation may be used in the weight formula along with a weight for that observation which can be, for example, 1 (for simple majority voting), or may be computed by either statistical or other empirical methods. In embodiments, the combination of weights for the objects may be replaced by a fully connected neural network, that may include hidden layers, or by a Support Vector Machine (SVM), where the weights are computed during the training phase.

The object detection framework of a CA/AD vehicle 202a-202n, or road traffic analytics application running at edge/road-side-unit such as 140 of FIG. 1, may include a pipeline of image processing modules. This pipeline takes frames captured by one or more cameras as input and applies a classifier to the frame data for object detection. The accuracy and computational complexity of object detection depends on the input resolution (e.g., HD or SD) and the number of layers used in the associated neural network used for classification. One configuration requires less compute resources but offers better accuracy over a given confidence threshold. Hence, configurations of such a neural network may vary among CA/AD vehicles 202a-202n from different manufacturers, or even of different brands within a manufacturer due to the possibility of different component suppliers. These configuration differences may exploit the trade-off between accuracy confidence thresholds and available computing resources. Also, in embodiments, the different neural network classifiers among CA/AD vehicles 202a-202n may have been trained on different training sets and as a consequence there is a diversity in their decision boundaries for identifying objects and classifications for those objects. As a result, a detection may be used to leverage the diversity of neural networks and their various decision boundaries with CA/AD vehicles 202a-202n to make the classifiers resilient to individual vehicle inadequate neural network training and/or directed adversarial attacks to attack the validity of the collaborative 3-D map.

Sensors 112, and in particular cameras, are useful for the functioning of a CA/AD vehicle. An anomaly in the camera data stream could have catastrophic results with respect to vehicle navigation. Cameras may be susceptible to an attack by a malicious agent, for example, a hacker who can alter the contents of the image stream which may result in incorrect object identification and/or classification. In other situations, the camera may inadvertently be faulty and provide incorrect images for processing.

Another method of attacks is to physically tamper with the real world environment. An example would be to physically tamper with a STOP sign 365 of FIG. 3 to fool the inference engines in autonomous cars, by obscuring the sign by applying regions 364a-364d. Another example is to perturb a speed limit sign 363 to make the sign difficult to recognize as a speed limit object, to obscure the speed limit number 362a by defacement 362b, or to confuse object classification as a speed limit sign by overlaying 362c the words "EXIT" to cause the speed limit sign to be classified as an exit sign. There are some examples of environmental perturbations below.

Figure 10:
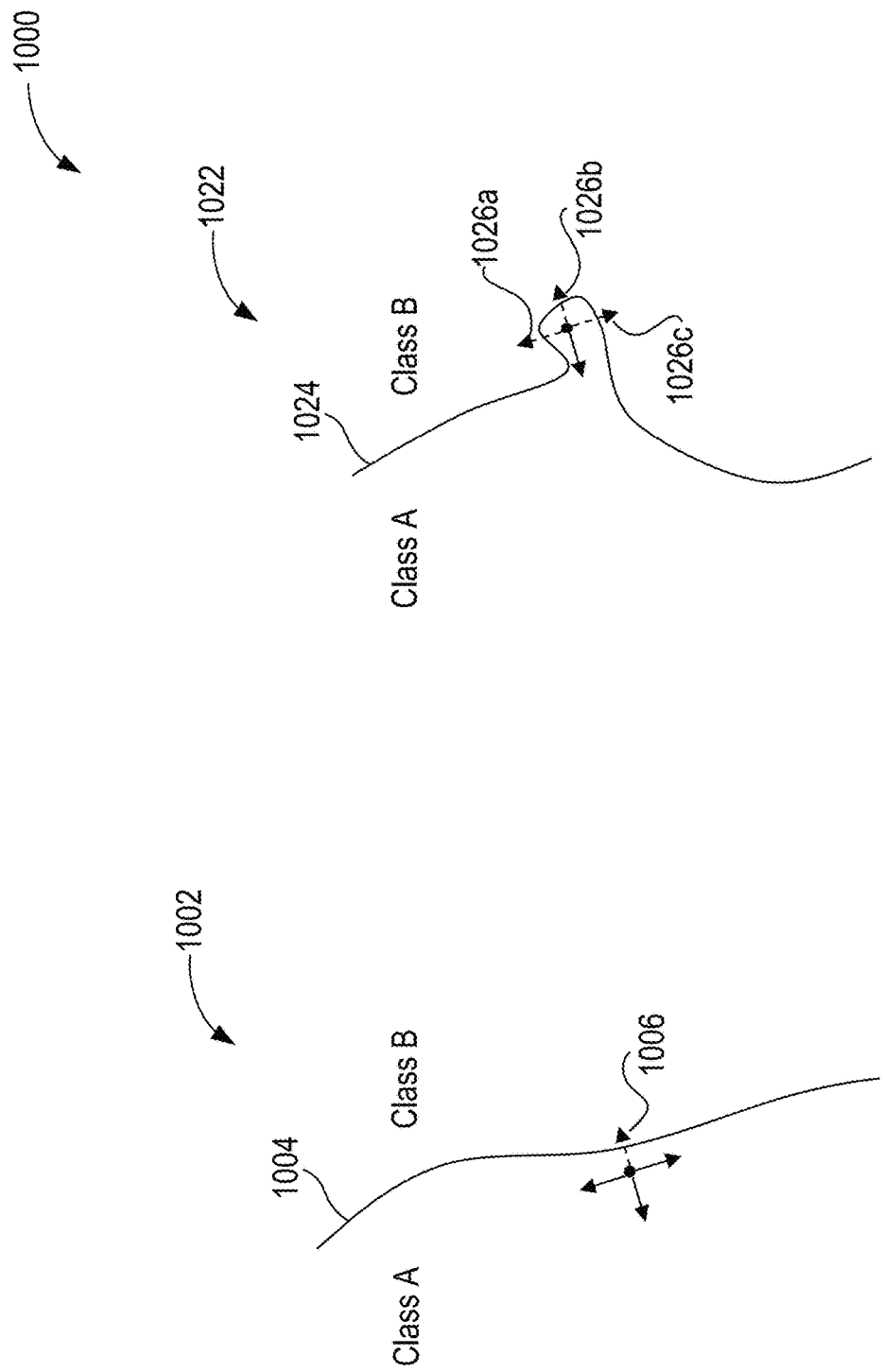
FIG. 10 illustrates an example of decision boundaries that may result from the application of neural network of FIG. 6, according to various embodiments.

There is a connection between the sensitivity to additive perturbations in the inputs, and the curvature of their decision boundaries. The directions where the decision boundary is curved characterizes the directions to which the object classifier is the most vulnerable to perturbations which can cause it to misclassify. For example, FIG. 10 shows a situation where the decision boundaries 1004, 1024 of two classifiers 1002, 1022 have different curvatures. For decision boundary 1004 figure perturbations on only one of the four axes 1006 can cause a misclassification while for decision boundary 1024 it is possible to perturb on three of the four axes 1026a, 1026b, 1026c to cause a misclassification. The decision boundaries 1004, 1024 are dependent on training data and the model. The use of a collaboration methodology leverages the diversity of the deep neural networks in various CA/AD vehicles. This diversity of implementations also results in a diversity of decision surfaces which makes them less vulnerable to adversarial attacks.

In embodiments, the collaborative 3-D map comparator 252 will match the localized object observations 251 from different CA/AD vehicle 202a-202n observers and use the scoring unit 256 to score any discrepancies using the semantic segmentation probabilities to a weighing function. The weights can be calculated empirically or computed using a SVM or a neural network after training.

Because, in embodiments, an ensemble of neural networks/classifiers associated with the different vehicles 202 have been used that have different topologies, different manufacturers (who purchased the underlying technology from different OEM suppliers) and hence are differently trained, the decision boundaries are different. This makes the distributed and consensus-based classifier approach more resilient to white box and black box attacks. It also catches object detection failures (anomaly objects 258) that may result due to inadequate training, hacks, or physical environment modifications, and facilitates CA/AD vehicles 202a-202n in operating safely by collaboratively understanding the environment.

Figure 4:
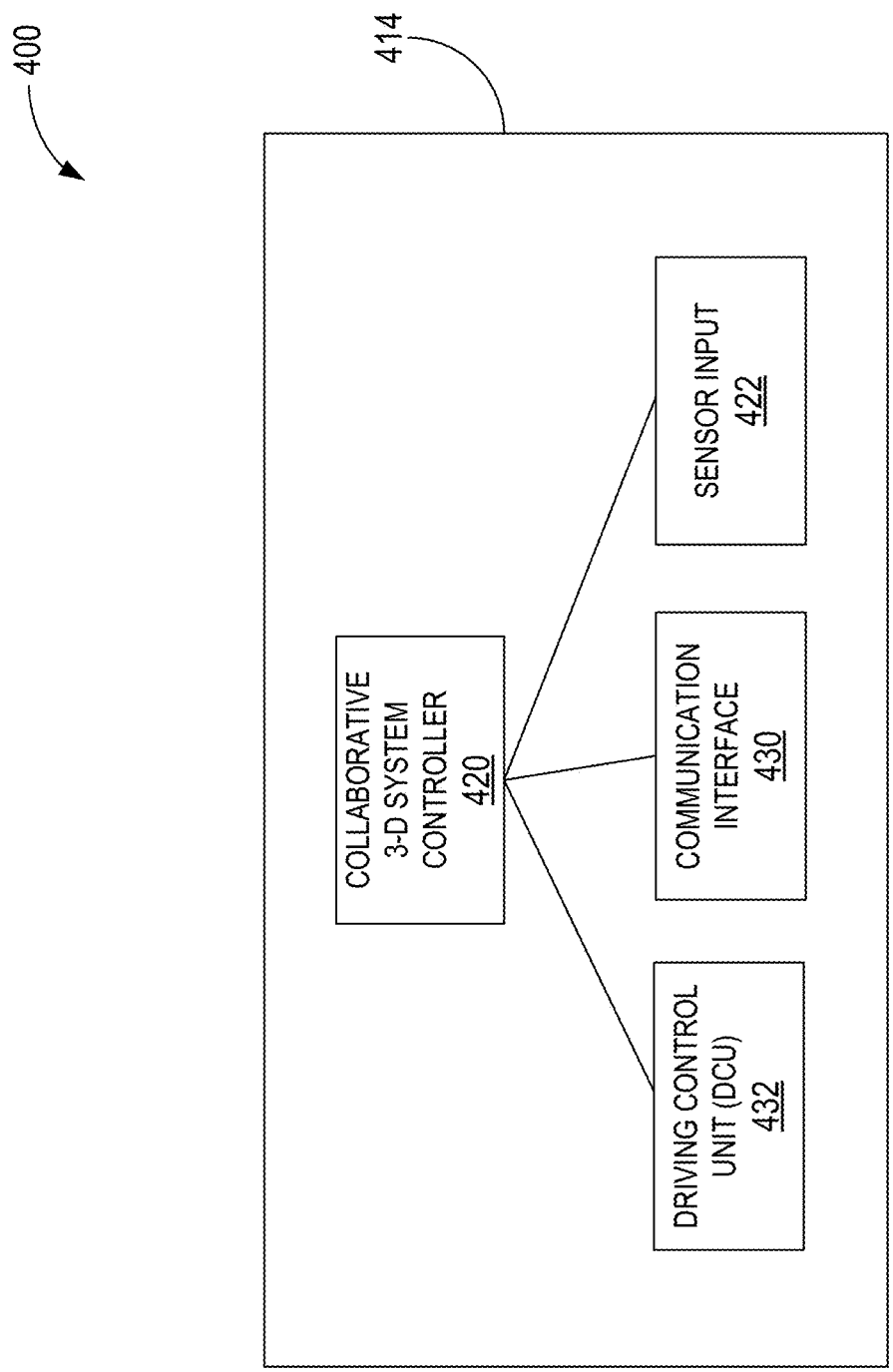
FIG. 4 illustrates a block diagram of a CA/AD vehicle incorporated with the collaborative 3-D mapping technology of the present disclosure, in accordance with various embodiments.

FIG. 4 illustrates a block diagram of a CA/AD vehicle incorporated with the collaborative 3-D mapping technology of the present disclosure, in accordance with various embodiments. Diagram 400 shows a collaborative 3-D map system controller 420, which may be similar to a collaborative 3-D map system controller 120 of FIG. 1, associated with CA/AD vehicle such as CA/AD vehicle 102 of FIG. 1. In embodiments, all or part of the collaborative 3-D map system controller 420 may be included within the IVS 114, or may be outside of the IVS 114 of CA/AD vehicle 102. In embodiments, the collaborative 3-D map system controller 420 may receive a plurality of indications of data from one or more sensors 122 of a CA/AD vehicle 102 or may receive indications portions of a 3-D map from another source such as a CA/AD vehicle 102 or a system 140.

In embodiments, the collaborative 3-D map system controller 420 may include a communication interface 430 that receives information from signals transmitted from one or more CA/AD vehicles 104, 106 from FIG. 1, or from node 140, and communicates that information to the collaborative 3-D map system controller 420 for processing. In embodiments, the communication interface 430 may also receive transmissions from an antenna tower 140 or from some other transmission source that may provide additional information to the CA/AD vehicle 102.

A driving control unit (DCU) 432 may receive commands from the collaborative 3-D map system controller 420, that may represent driving adjustments, and then cause those driving adjustments to be implemented in the CA/AD vehicle 102.

Sensor input 422 may also be received from various sensors located within the CA/AD vehicle 102, as described above. This sensor input 422 may also be transmitted to the controller 420 for identifying and/or classifying objects proximate to the CA/AD vehicle 102, and for processing and/or determining driving adjustments to be made.

In embodiments, collaborative 3-D map system controller 420 may be implemented in hardware, software, or a combination thereof. Hardware implementations may include ASIC or programmable circuits. Software implementations may include a processor, memory and instructions embodied in the below described logic of the logic blocks in FIG. 4.

Example hardware implementations may include by are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high-level programming languages that can be compiled into instruction of the ISA of the target processors. In some embodiments, especially those embodiments where controller 326 includes at least one neural network, at least a portion of collaborative 3-D map system controller 420 may be implemented in an accelerator. One example software architecture and an example hardware computing platform will be further described later with references to FIGS. 7-8.

Figure 5:
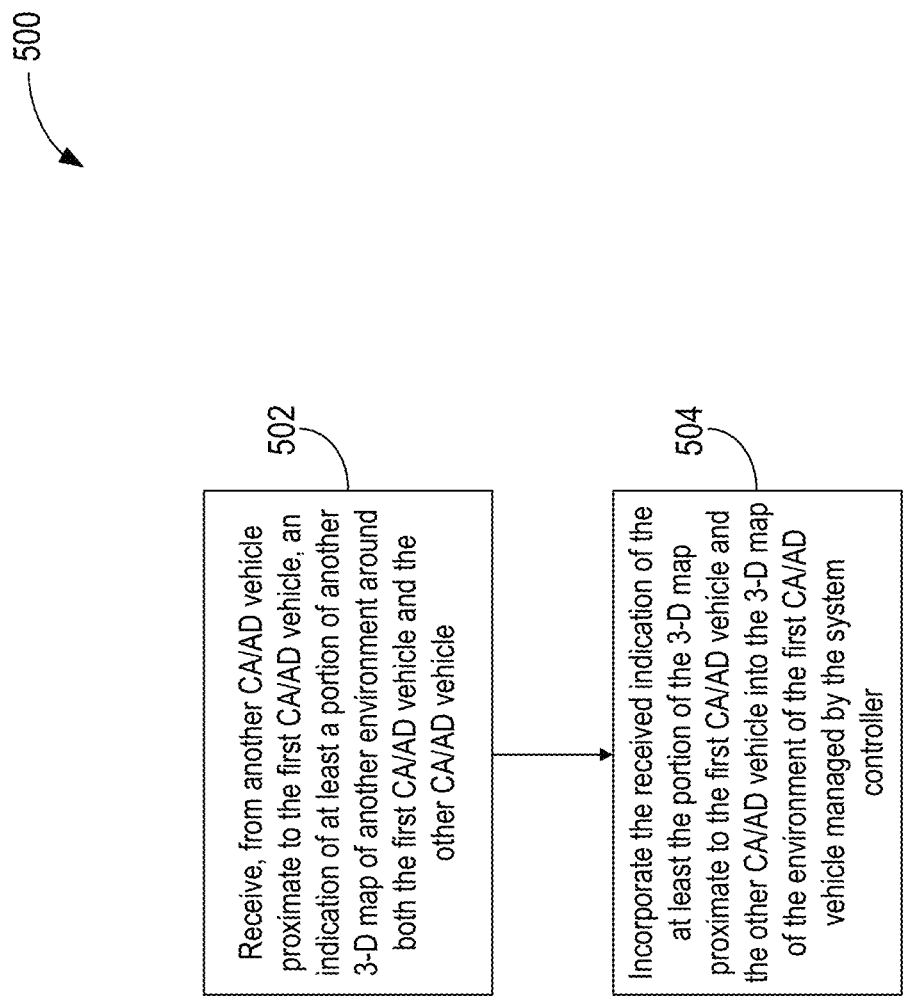
FIG. 5 illustrates an example process for collecting data to be used in collaborative 3-D mapping, in accordance with various embodiments.

FIG. 5 illustrates an example process for collecting data to be used in collaborative 3-D mapping, in accordance with various embodiments. Process 500 may be implemented using the features, components, or systems as described in FIGS. 1-4 and 6-9.

At block 502, the process may include receiving, from another CA/AD vehicle proximate to the first CA/AD vehicle, an indication of at least a portion of another 3-D map of another environment around both the first CA/AD vehicle and the other CA/AD vehicle. In embodiments, the first CA/AD vehicle may be vehicle 102 of FIG. 1 and the other CA/AD vehicle proximate to the first CA/AD vehicle may be vehicle 104, 106. In embodiments, the other CA/AD vehicle may be the beacon 140 of FIG. 1.

At block 504, the process may include incorporating the received indication of the at least the portion of the 3-D map proximate to the first CA/AD vehicle and the other CA/AD vehicle into the 3-D map of the environment of the first CA/AD vehicle managed by the system controller. In embodiments, the system controller may be similar to the collaborative 3-D map system controller 120 of FIG. 1. In other embodiments, the system controller may reside in the system 142 of FIG. 1. In embodiments, incorporating the received indication may include providing localization using localizer 250, and a collaborative 3-D map comparator 252 to associate various objects the other CA/AD vehicle to identify anomalies within the compared 3-D maps, which may be similar to the anomalies and probabilities 254$a$, 254$b$, 254$c$, ..., 254$n$, which may be then processed by a scoring unit 256 to produce an augmented collaborative 3-D map 260.

Figure 6:
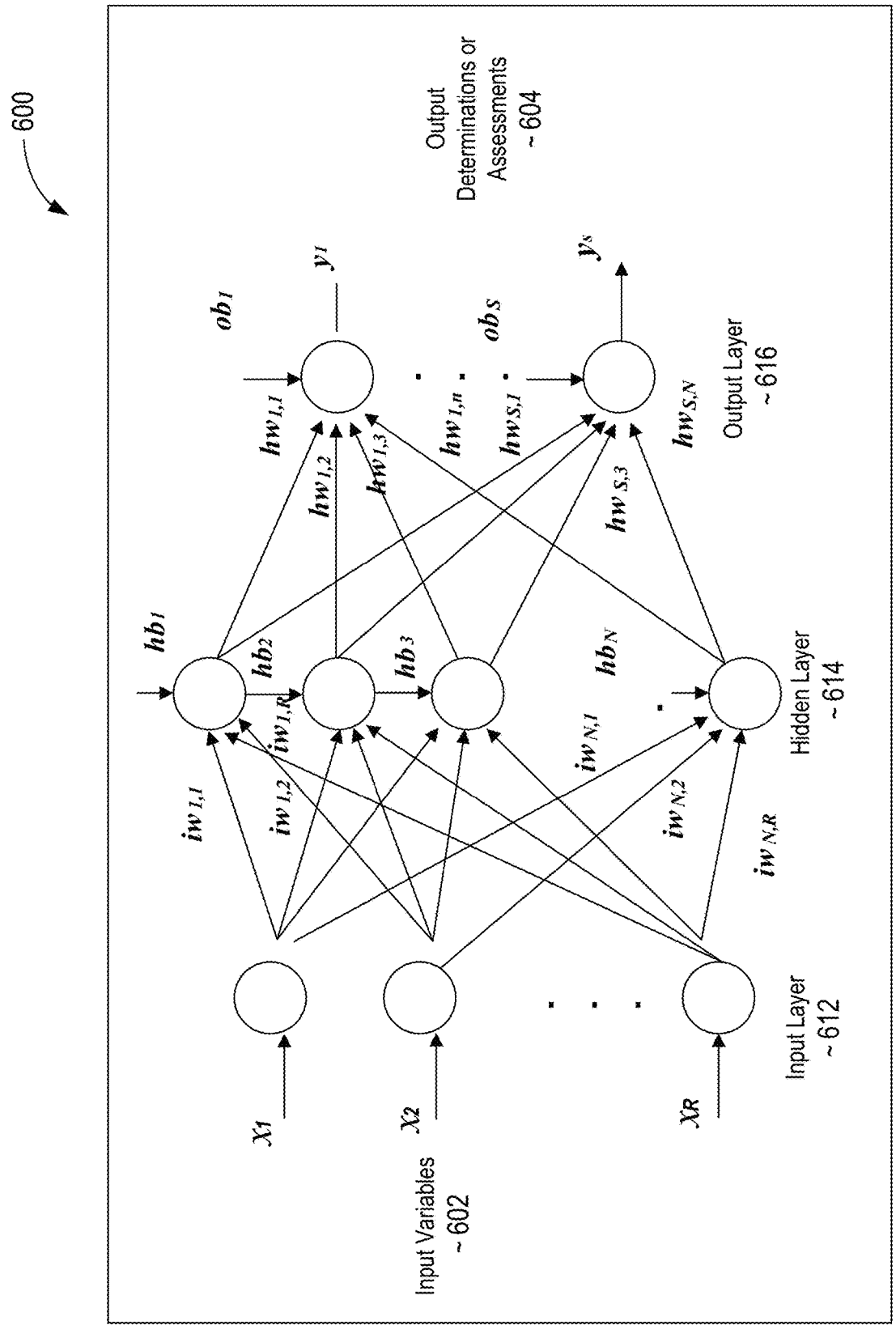
FIG. 6 illustrates an example neural network suitable for use with present disclosure, according to various embodiments.

In some embodiments, the collaborative 3-D map system controller 420 may include one or more trained neural networks in performing its determinations and/or assessments. FIG. 6 illustrates an example neural network suitable for use with present disclosure, according to various embodiments. As shown, example neural network 600 may be a multilayer feedforward neural network (FNN) comprising an input layer 612, one or more hidden layers 614 and an output layer 616. Input layer 612 receives data of input variables ($x_i$) 602. Hidden layer(s) 614 processes the inputs, and eventually, output layer 616 outputs the determinations or assessments ($y_i$) 604. In one example implementation the input variables ($x_i$) 602 of the neural network are set as a vector containing the relevant variable data, while the output determination or assessment ($y_i$) 604 of the neural network are also as a vector.

Multilayer feedforward neural network (FNN) may be expressed through the following equations:

$$ho_i = f(\Sigma_{j=1}^{R}(iw_{i,j}x_j) + hb_i), \text{ for } i=1,\ldots,N$$

$$y_i = f(\Sigma_{k=1}^{R}(hw_{i,k}ho_k) + ob_i), \text{ for } i=1,\ldots,S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables $i_w$, $h_w$, $h_b$, and $o_b$, via training, as follows:

$$E = \Sigma_{k=1}^{m}(E_k), \text{ where } E_k = \Sigma_{p=1}^{S}(t_{kp} - y_{kp})^2$$

where $y_{kp}$ and $t_{kp}$ are the predicted and the target values of $p^{th}$ output unit for sample k, respectively, and m is the number of samples.

In some embodiments, the collaborative 3-D map system controller 420 may include a pre-trained neural network 600 to reconcile the sensors and object detection signals received from CA/AD vehicles 102, 104, 106. The input variables ($x_i$) 602 may include sensor and object data received from the neighboring CA/AD vehicles as well as sensor and object data collected/detected by various local vehicles sensors, such as accelerometer, gyroscopes, IMU, and so forth. The output variables ($y_i$) 604 may include the reconciled objects of the environment and their positions. The network variables of the hidden layer(s) for the neural network of collaborative 3-D map system controller 420, maybe determined by the training data.

Figure 7:
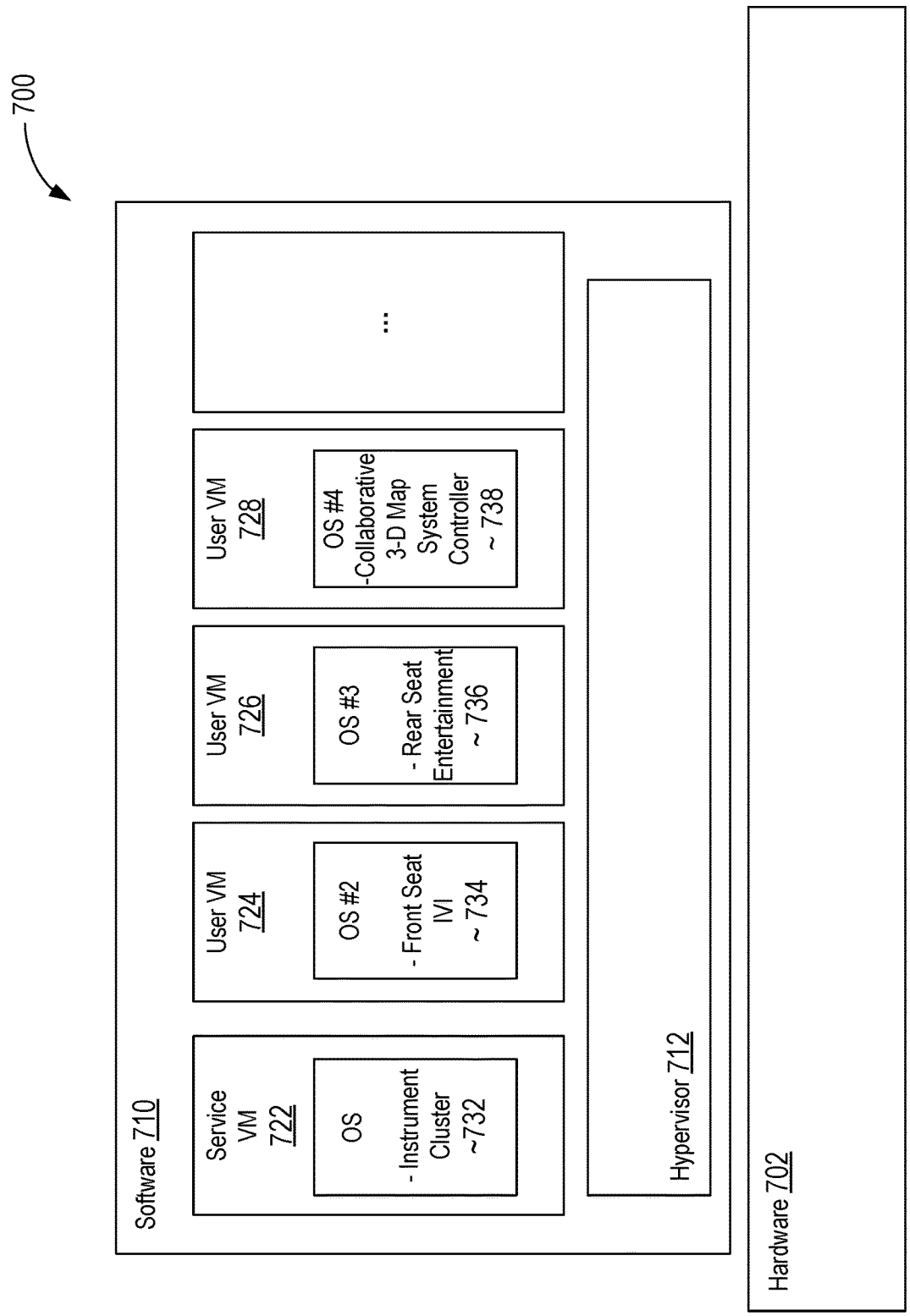
FIG. 7 illustrates a software component view of a CA/AD system in a CA/AD vehicle, according to various embodiments.

In the example of FIG. 6, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth FIG. 7 illustrates a software component view of a CA/AD system in a CA/AD vehicle, according to various embodiments. As shown, for the embodiments, CA/AD system 700, which may be IVS 114 of FIG. 1, includes hardware 702 and software 710. Software 710 includes hypervisor 712 hosting a number of virtual machines (VMs) 722-728. Hypervisor 712 is configured to host execution of VMs 722-728. The VMs 722-728 include a service VM 722 and a number of user VMs 724-728. Service machine 722 includes a service OS hosting execution of a number of instrument cluster applications 732. User VMs 724-728 may include a first user VM 724 having a first user OS hosting execution of front seat in-vehicle infotainment applications (IVI) 734, a second user VM 726 having a second user OS hosting execution of rear seat infotainment applications 736, a third user VM 728 having a third user OS hosting execution of a collaborative 3-D map system controller 738, such as collaborative 3-D map system controller 120 of FIG. 1 or 420 of FIG. 4, and so forth.

Except for collaborative 3-D map system controller 738 of the present disclosure incorporated, elements 712-738 of software 710 may be any one of a number of these elements known in the art. For example, hypervisor 712 may be any one of a number of hypervisors known in the art, such as KVM, an open source hypervisor, Xen®, available from Citrix® Inc, of Fort Lauderdale, Fla., or VMware®, available from VMware Inc of Palo Alto, Calif., and so forth. Similarly, service OS of service VM 722 and user OS of user VMs 724-728 may be any one of a number of OS known in the art, such as Linux™, available e.g., from Red Hat® Enterprise of Raleigh, N.C., or Android®, available from Google® of Mountain View, Calif.

Figure 8:
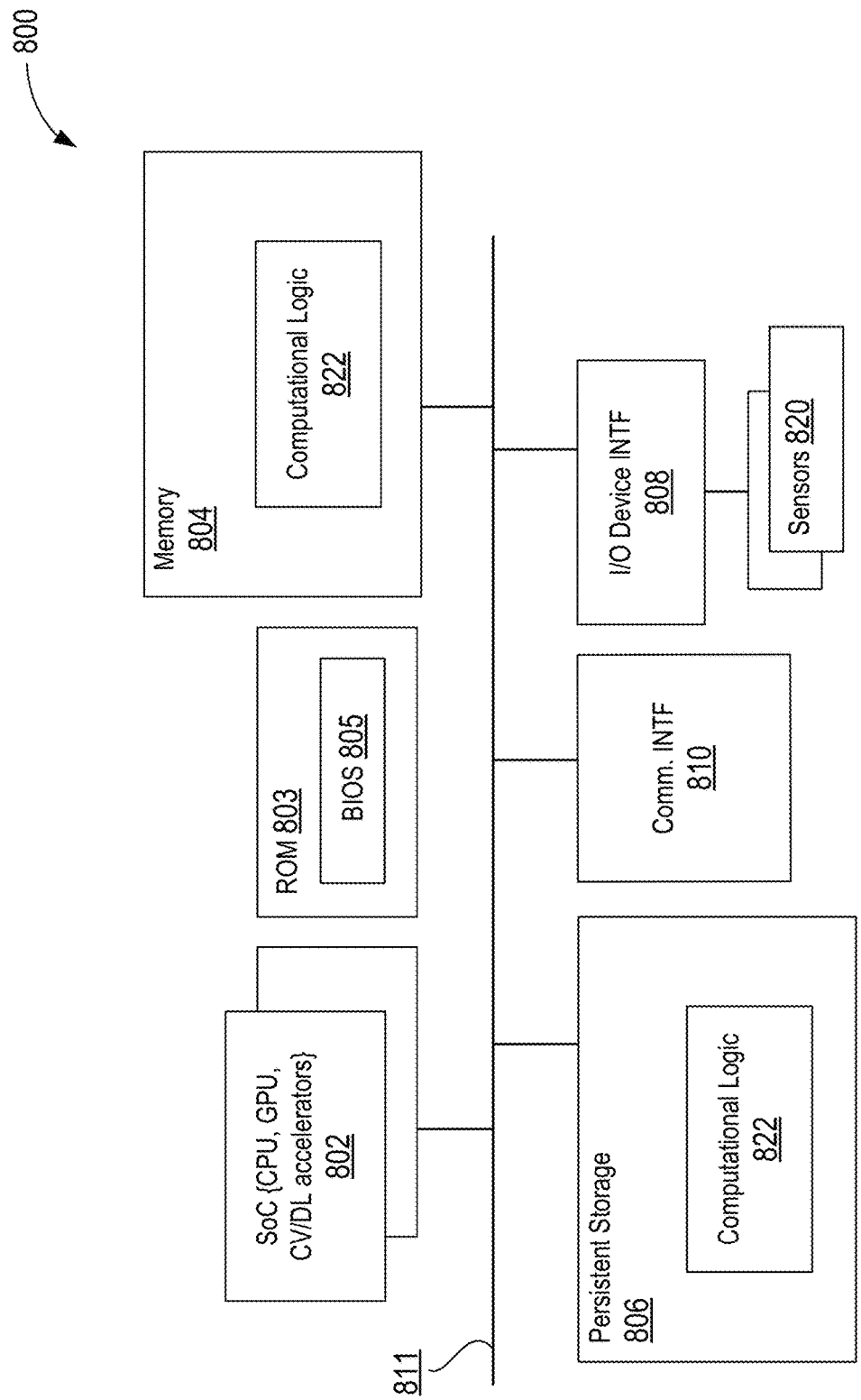
FIG. 8 illustrates a hardware component view of a CA/AD system in a CA/AD vehicle, according to various embodiments.

FIG. 8 illustrates a hardware component view of a CA/AD system in a CA/AD vehicle, according to various embodiments. As shown, computing platform 800, which may be hardware 702 of FIG. 7, may include one or more system-on-chips (SoCs) 802, ROM 803 and system memory 804. Each SoCs 802 may include one or more processor cores (CPUs), one or more graphics processor units (GPUs), one or more accelerators, such as computer vision (CV) and/or deep learning (DL) accelerators. ROM 803 may include basic input/output system services (BIOS) 805. CPUs, GPUs, and CV/DL accelerators may be any one of a number of these elements known in the art. Similarly, ROM 803 and BIOS 805 may be any one of a number of ROM and BIOS known in the art, and system memory 804 may be any one of a number of volatile storage known in the art.

Additionally, computing platform 800 may include persistent storage devices 806. Example of persistent storage devices 806 may include, but are not limited to, flash drives, hard drives, compact disc read-only memory (CD-ROM) and so forth. Further, computing platform 800 may include one or more input/output (I/O) interfaces 808 to interface with one or more I/O devices, such as sensors 820. Other example I/O devices may include, but are not limited to, display, keyboard, cursor control and so forth. Computing platform 800 may also include one or more communication interfaces 810 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 811, which may represent one or more buses. In the case of multiple buses, they may be bridged by one or more bus bridges (not shown).

Each of these elements may perform its conventional functions known in the art. In particular, ROM 803 may include BIOS 805 having a boot loader. System memory 804 and mass storage devices 806 may be employed to store a working copy and a permanent copy of the programming instructions implementing the operations associated with hypervisor 712, service/user OS of service/user VM 722-728, and components of IVS 114 (instrument cluster 732, front seat entertainment 734, rear seat entertainment 736, collaborative 3-D map system controller 738), collectively referred to as computational logic 822. The various elements may be implemented by assembler instructions supported by processor core(s) of SoCs 802 or high-level languages, such as, for example, C, that can be compiled into such instructions. In some embodiments, portion of computation logic 822 may be implemented with accelerators of SoC 802.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 9:
FIG. 9 illustrates a storage medium having instructions for practicing methods described with references to FIGS. 1-10, according to various embodiments.

FIG. 9 illustrates a storage medium having instructions for practicing methods described with references to FIGS. 1-8 and 10, according to various embodiments. The computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., computing platform 800, in response to execution of the programming instructions, to implement (aspects of) hypervisor 712, service/user OS of service/user VM 722-728, and components of IVS 114 (instrument cluster 732, front seat entertainment 734, rear seat entertainment 736, collaborative 3-D map system controller 738.) In alternate embodiments, programming instructions 904 may be disposed on multiple computer-readable non-transitory storage media 902 instead. In still other embodiments, programming instructions 904 may be disposed on computer-readable transitory storage media 902, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object-oriented programming language such as Java®, Smalltalk®, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be an apparatus for computer-assisted or autonomous driving (CA/AD), comprising: a system controller, disposed in a first CA/AD vehicle, to manage a collaborative three-dimensional (3-D) map of an environment around the first CA/AD vehicle, wherein the system controller is to: receive, from another CA/AD vehicle proximate to the first CA/AD vehicle, an indication of at least a portion of another 3-D map of another environment around both the first CA/AD vehicle and the other CA/AD vehicle; incorporate the received indication of the at least the portion of the 3-D map proximate to the first CA/AD vehicle and the other CA/AD vehicle into the 3-D map of the environment of the first CA/AD vehicle managed by the system controller.

Example 2 may include the apparatus of example 1, wherein the 3-D map includes an indication of one or more objects, wherein an object includes a classification selected from one of a plurality of classifications and wherein one of the one or more objects is detected by another CA/AD vehicle and is not detectible by the first CA/AD vehicle.

Example 3 may include the apparatus of example 1, wherein the system controller is further to: receive, from sensors within the first CA/AD vehicle, observations of the environment around the first AV, and based upon the received observations, determine indications of at least a portion of the 3-D map of the environment around the first AV; and wherein the apparatus further includes a communication subsystem, disposed in the first AV and coupled with the system controller, to transmit the determined indications of the at least a portion of the 3-D map of the environment of the first CA/AD vehicle to the other CA/AD vehicle.

Example 4 may include the apparatus of example 1, wherein the system controller is further to evaluate the received indication of the at least the portion of the 3-D map of the other environment around the first CA/AD vehicle and the other CA/AD vehicle to determine whether the received indication is to be incorporated into the 3-D map of the environment around the first CA/AD vehicle.

Example 5 may include the apparatus of example 4, wherein to evaluate the received indication of at least the portion of the 3-D map of the other environment around both the first CA/AD vehicle and the other CA/AD vehicle further includes to: evaluate a voting weight to be assigned to the received indication of the at least the portion of the 3-D map of the other environment around both the first CA/AD vehicle and the other CA/AD vehicle; and based upon the evaluation, determine how much the portion of the received indication of the at least the portion of the 3-D map of the other environment around the first CA/AD vehicle and the other CA/AD vehicle is to be incorporated into the 3-D map of the environment around the first CA/AD vehicle.

Example 6 may include the apparatus of example 5, wherein to evaluate a voting weight to be assigned includes to evaluate a voting weight of an indication of an object with a classification in the received indication of the at least the portion of the 3-D map of the other environment around the first CA/AD vehicle and the other CA/AD vehicle.

Example 7 may include the apparatus of example 5, wherein to evaluate the voting weight to be assigned, includes to evaluate the voting weight to be assigned based upon a neural network or a support vector machine (SVM).

Example 8 may include the apparatus of example 5, wherein the voting weight is determined by a detection probability.

Example 9 may include the apparatus of example 1, wherein the indication of the at least the portion of the 3-D map of the environment around both the first CA/AD vehicle and the other CA/AD vehicle includes an indication of a visual representation.

Example 10 may include the apparatus of example 9, wherein the indication of the visual representation includes an octree or a subset of an octree.

Example 11 may include the apparatus of example 10, wherein the octree or the subset of the octree includes a timestamp or a frame of reference.

Example 12 may include a method to manage a collaborative 3-D map of an environment of a first CA/AD vehicle, comprising: receiving, from another CA/AD vehicle proximate to the first CA/AD vehicle, an indication of at least a portion of another 3-D map of another environment around the first CA/AD vehicle and the other CA/AD vehicle; and incorporating the received indication of the at least the portion of the 3-D map proximate to the first CA/AD vehicle and the other CA/AD vehicle into the 3-D map of the environment of the first CA/AD vehicle.

Example 13 may include the method of example 12, wherein the 3-D map includes an indication of one or more objects, wherein an object includes a classification selected from one of a plurality of classifications and wherein one of the one or more objects is detected by the another CA/AD vehicle and is not detectible by the first CA/AD vehicle.

Example 14 may include the method of example 13, wherein the plurality of classifications is to detect anomalies, combat adversarial attacks, or increase a training set size.

Example 15 may include the method of example 12, further comprising: receiving, from sensors within the first CA/AD vehicle, observations of the environment around the first CA/AD, and based upon the received observations, determining indications of at least a portion of the 3-D map of the environment around the first AV; and transmitting, by a communication subsystem, disposed in the first AV, the determined indications of the at least a portion of the 3-D map of the environment of the first CA/AD vehicle to the other CA/AD vehicle.

Example 16 may include the method of example 15, wherein the receiving and the transmitting are via CA/AD vehicle to CA/AD vehicle communication.

Example 17 may include the method of example 12, further comprising evaluating the received indication of the at least the portion of the 3-D map of the other environment around both the first CA/AD vehicle and the other CA/AD vehicle to determine whether the received indication is to be incorporated into the 3-D map of the environment around the first CA/AD vehicle.

Example 18 may include the method of example 17, wherein evaluating the received indication of at least the portion of the 3-D map of the other environment around both the first CA/AD vehicle and the other CA/AD vehicle further includes: evaluating a voting weight to be assigned to the received indication of the at least the portion of the 3-D map of the other environment around both the first CA/AD vehicle and the other CA/AD vehicle; and based upon the evaluation, determining how much the portion of the received indication of the at least the portion of the 3-D map of the other environment around both the first CA/AD vehicle and the other CA/AD vehicle is to be incorporated into the 3-D map of the environment around the first CA/AD vehicle.

Example 19 may include the method of example 18, wherein evaluating a voting weight to be assigned includes evaluating a voting weight of an indication of an object with a classification in the received indication of the at least the portion of the 3-D map of the other environment around both the first CA/AD vehicle and the other CA/AD vehicle.

Example 20 may include the method of example 18, wherein evaluating the voting weight to be assigned, includes evaluating the voting weight to be assigned based upon a neural network or a support vector machine (SVM).

Example 21 include the method of example 18, wherein the voting weight is determined by a detection probability or a confidence placed by a vendor supplying a classifier.

Example 22 may be one or more computer-readable media comprising instructions that cause a computing device in a CA/AD vehicle, in response to execution of the instructions by the computing device, to: receive, from another CA/AD vehicle proximate to a first CA/AD vehicle, an indication of at least a portion of another 3-D map of another environment around both the first CA/AD vehicle and the other CA/AD vehicle; and incorporate he at least the portion of the 3-D map proximate to the first CA/AD vehicle and the other CA/AD vehicle into the 3-D map of the environment of the first CA/AD vehicle.

Example 23 may include the one or more computer-readable media of example 22, wherein the 3-D map includes an indication of one or more objects, wherein an object includes a classification selected from one of a plurality of classifications and wherein one of the one or more objects is detected by the another CA/AD vehicle and is not detectible by the first CA/AD vehicle.

Example 24 may include the one or more computer-readable media of example 22, wherein the instructions are to further: receive, from sensors within the first CA/AD vehicle, observations of the environment around the first AV, and based upon the received observations, determined indications of at least a portion of the 3-D map of the environment around the first AV; evaluate the received indication of the at least the portion of the 3-D map of the other environment around both the first CA/AD vehicle and the other CA/AD vehicle to determine whether the received indication is to be incorporated into the 3-D map of the environment around the first CA/AD vehicle; and transmit, by a communication subsystem, disposed in the first AV, the determined indications of the at least a portion of the 3-D map of the environment of the first CA/AD vehicle to the other CA/AD vehicle.

Example 25 may include the one or more computer-readable media of example 24, wherein to evaluate the received indication of at least the portion of the 3-D map of the other environment around both the first CA/AD vehicle and the other CA/AD vehicle further includes: to evaluate a voting weight to be assigned to the received indication of the at least the portion of the 3-D map of the other environment around both the first CA/AD vehicle and the other CA/AD vehicle; and based upon the evaluation, to determine how much the portion of the received indication of the at least the portion of the 3-D map of the other environment around both the first CA/AD vehicle and the other CA/AD vehicle is to be incorporated into the 3-D map of the environment around the first CA/AD vehicle.

What is claimed is:

1. An apparatus for computer-assisted or autonomous driving (CA/AD), comprising:
    a system controller, disposed in a first CA/AD vehicle, to manage a three-dimensional (3-D) map of an environment around the first CA/AD vehicle, wherein the system controller is to:
    receive, from a second CA/AD vehicle proximate to the first CA/AD vehicle, an indication of at least a portion of another 3-D map of another environment around both the first CA/AD vehicle and the second CA/AD vehicle;
    evaluate the received indication of the at least the portion of the another 3-D map to determine whether the portion is to be incorporated into the 3-D map of the environment around the first CA/AD vehicle, wherein to evaluate the received indication, the system controller is to: evaluate a voting weight to be assigned to the received indication of the at least the portion of the another 3-D map, and based upon the evaluation of the voting weight, determine whether the portion of the another 3-D map is to be incorporated into the 3-D map of the environment around the first CA/AD vehicle; and
    receive, from sensors within the first CA/AD vehicle, observations of the environment around the first CA/AD vehicle, and based upon the received observations, determine indications of at least a portion of the 3-D map of the environment around the first CA/AD vehicle;
    wherein the apparatus further includes a communication subsystem, disposed in the first CA/AD vehicle and coupled with the system controller, to transmit the determined indications of the at least the portion of the 3-D map of the environment around the first CA/AD vehicle to the second CA/AD vehicle.

2. The apparatus of claim 1, wherein the received indication is of an object, the object includes a classification selected from one of a plurality of classifications and the object is detected by the second CA/AD vehicle when the object is not detectible by the first CA/AD vehicle.

3. The apparatus of claim 1, wherein:
    the received indication is of an object; and
    to evaluate the voting weight to be assigned, the system controller is to evaluate a voting weight of the received indication of the object.

4. The apparatus of claim 1, wherein the system controller is to evaluate the voting weight to be assigned based upon a neural network or a support vector machine (SVM).

5. The apparatus of claim 1, wherein the voting weight is determined by a detection probability.

6. The apparatus of claim 1, wherein the indication of the at least the portion of the another 3-D map includes an indication of a visual representation.

7. The apparatus of claim 6, wherein the indication of the visual representation includes an octree or a subset of an octree.

8. The apparatus of claim 7, wherein the octree or the subset of the octree includes at least one of a timestamp or a frame of reference.

9. The apparatus of claim 1, wherein the received indication is of an object and the voting weight is a function of a detection probability of the object.

10. A method to manage a collaborative 3-D map of an environment around a first computer-assisted or autonomous driving (CA/AD) vehicle, comprising:
    receiving, from a second CA/AD vehicle proximate to the first CA/AD vehicle, an indication of at least a portion of another 3-D map of another environment around both the first CA/AD vehicle and the second CA/AD vehicle;
    evaluating the received indication of the at least the portion of the another 3-D map to determine how much of the portion is to be incorporated into the collaborative 3-D map of the environment around the first CA/AD vehicle, wherein the evaluating the received indication comprises: evaluating a voting weight to be assigned to the received indication of the at least the portion of the another 3-D map, and based upon the evaluating of the voting weight, determining how much of the portion of the another 3-D map is to be incorporated into the collaborative 3-D map of the environment around the first CA/AD vehicle;
    receiving, from sensors within the first CA/AD vehicle, observations of the environment around the first CA/AD vehicle;
    based upon the received observations, determining indications of at least a portion of the collaborative 3-D map of the environment around the first CA/AD vehicle; and
    transmitting, by a communication subsystem, disposed in the first CA/AD vehicle, the determined indications of the at least the portion of the collaborative 3-D map of the environment around the first CA/AD vehicle to the second CA/AD vehicle.

11. The method of claim 10, wherein the received indication is of an object, the object includes a classification selected from one of a plurality of classifications and the object is detected by the second CA/AD vehicle when the object is not detectible by the first CA/AD vehicle.

12. The method of claim 11, wherein the plurality of classifications are to at least one of: detect anomalies, combat adversarial attacks, or increase a training set size.

13. The method of claim 10, wherein the receiving and the transmitting are via CA/AD vehicle to CA/AD vehicle communication.

14. The method of claim 10, wherein:
    the received indication is of an object; and
    the evaluating the voting weight to be assigned includes evaluating a voting weight of the received indication of the object.

15. The method of claim 10, wherein evaluating the voting weight to be assigned is based upon a neural network or a support vector machine (SVM).

16. The method of claim 10, wherein the received indication is of an object and the voting weight is determined by a confidence placed in a vendor supplying a classifier of the object.

17. One or more non-transitory computer-readable media comprising instructions that cause integrated circuitry (IC) in a first computer-assisted or autonomous driving (CA/AD) vehicle, in response to execution of the instructions by the IC, to:
  obtain a 3-D map of an environment around the first CA/AD vehicle based on sensors of the first CA/AD vehicle;
  identify an object in the environment around the first CA/AD vehicle based on a neural network of the first CA/AD vehicle;
  receive, from a second CA/AD vehicle proximate to the first CA/AD vehicle, another 3-D map of another environment around both the first CA/AD vehicle and the second CA/AD vehicle, the another 3-D map identifies an object in the another environment around both the first CA/AD vehicle and the second CA/AD vehicle based on a neural network of the second CA/AD vehicle; and
  incorporate the object identified in the another 3-D map into the 3-D map of the environment around the first CA/AD vehicle, wherein a data set on which the neural network of the first CA/AD vehicle is trained is different than a data set on which the neural network of the second CA/AD vehicle is trained, wherein an accuracy of the neural network of the first CA/AD vehicle in identifying objects is different than an accuracy of the neural network of the second CA/AD vehicle in identifying objects.

18. The one or more non-transitory computer-readable media of claim 17, wherein decision boundaries of the neural network of the first CA/AD vehicle for identifying objects are different than decision boundaries of the neural network of the second CA/AD vehicle for identifying objects.

19. The one or more non-transitory computer-readable media of claim 17, wherein a number of layers in the neural network of the first CA/AD vehicle is different than a number of layers in the neural network of the second CA/AD vehicle.

20. The one or more non-transitory computer-readable media of claim 17, wherein there is a diversity in decision boundaries of the neural network of the first CA/AD vehicle and the neural network of the second CA/AD vehicle for identifying objects and classifications for those objects.

21. One or more non-transitory computer-readable media (NTCRM) comprising instructions, wherein execution of the instructions by a computer in a first computer-assisted or autonomous driving (CA/AD) vehicle is to cause the computer to:
  obtain a first three dimensional (3-D) map of an environment around the first CA/AD vehicle based on sensors of the first CA/AD vehicle;
  identify an object in the environment around the first CA/AD vehicle based on a neural network of the first CA/AD vehicle;
  receive, from a second CA/AD vehicle proximate to the first CA/AD vehicle, a second 3-D map of a second environment around both the first CA/AD vehicle and the second CA/AD vehicle, the second 3-D map identifies an object in the second environment around both the first CA/AD vehicle and the second CA/AD vehicle based on a neural network of the second CA/AD vehicle; and
  incorporate the object identified in the second 3-D map into the first 3-D map of the environment around the first CA/AD vehicle, wherein a data set on which the neural network of the first CA/AD vehicle is trained is different than a data set on which the neural network of the second CA/AD vehicle is trained, and there is a diversity in decision boundaries of the neural network of the first CA/AD vehicle and the neural network of the second CA/AD vehicle for identifying objects and classifications for those objects.

22. The one or more NTCRM media of claim 21, wherein decision boundaries of the neural network of the first CA/AD vehicle for identifying objects are different than decision boundaries of the neural network of the second CA/AD vehicle for identifying objects.

23. The one or more NTCRM media of claim 21, wherein an accuracy of the neural network of the first CA/AD vehicle in identifying objects is different than an accuracy of the neural network of the second CA/AD vehicle for identifying objects.

24. The one or more NTCRM media of claim 21, wherein a number of layers in the neural network of the first CA/AD vehicle is different than a number of layers in the neural network of the second CA/AD vehicle.

* * * * *